US011237666B2

(12) United States Patent
Chen et al.

(10) Patent No.: US 11,237,666 B2
(45) Date of Patent: Feb. 1, 2022

(54) FABRICATION METHOD OF PANEL, PANEL AND DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Jun Chen, Beijing (CN); Ming Zhang, Beijing (CN); Zhanqi Xu, Beijing (CN); Cui Chen, Beijing (CN); Yang Li, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 705 days.

(21) Appl. No.: 16/080,828

(22) PCT Filed: Jan. 4, 2018

(86) PCT No.: PCT/CN2018/071288
§ 371 (c)(1),
(2) Date: Aug. 29, 2018

(87) PCT Pub. No.: WO2018/227951
PCT Pub. Date: Dec. 20, 2018

(65) Prior Publication Data
US 2021/0200405 A1    Jul. 1, 2021

(30) Foreign Application Priority Data
Jun. 16, 2017    (CN) .......................... 201710457046.X

(51) Int. Cl.
*G06F 3/041*    (2006.01)
*G06F 3/044*    (2006.01)

(52) U.S. Cl.
CPC ........ *G06F 3/04164* (2019.05); *G06F 3/0412* (2013.01); *G06F 3/0443* (2019.05);
(Continued)

(58) Field of Classification Search
None
See application file for complete search history.

(56) References Cited

U.S. PATENT DOCUMENTS

2011/0007005 A1    1/2011    Lee et al.
2011/0298750 A1    12/2011    Wang et al.
(Continued)

FOREIGN PATENT DOCUMENTS

CN    102804108 A    11/2012
CN    103176631 A    6/2013
(Continued)

OTHER PUBLICATIONS

Jan. 27, 2021—(EP) Extended European Search Report Appn 18755119.7.
(Continued)

*Primary Examiner* — Duane N Taylor, Jr.
(74) *Attorney, Agent, or Firm* — Banner & Witcoff, Ltd.

(57) ABSTRACT

A fabrication method of a panel, a panel and a display device are provided. The fabrication method of the panel includes: forming a first conductive layer on a base substrate by using a patterning process, the first conductive layer including a plurality of first conductive traces provided in a non-working region of the base substrate and a plurality of electrode patterns provided in a working region of the base substrate; forming a plurality of metal traces on the plurality of first conductive traces, wherein, each of the metal traces includes a connection end close to an edge of the working region of the base substrate.

17 Claims, 12 Drawing Sheets

(52) U.S. Cl.
CPC .............. *G06F 2203/04103* (2013.01); *G06F 2203/04111* (2013.01)

(56) References Cited

U.S. PATENT DOCUMENTS

| | | | |
|---|---|---|---|
| 2013/0043068 A1* | 2/2013 | Xie | G06F 3/0446 |
| | | | 174/262 |
| 2014/0152910 A1 | 6/2014 | Kang et al. | |
| 2016/0209959 A1* | 7/2016 | Lee | G06F 3/0443 |
| 2016/0299594 A1 | 10/2016 | Zhang et al. | |
| 2017/0060303 A1 | 3/2017 | Chen et al. | |
| 2017/0262109 A1* | 9/2017 | Choi | H01L 51/5253 |

FOREIGN PATENT DOCUMENTS

| | | |
|---|---|---|
| CN | 103345337 A | 10/2013 |
| CN | 103995612 A | 8/2014 |
| CN | 105094401 A | 11/2015 |
| CN | 105094444 A | 11/2015 |
| CN | 106201145 A | 12/2016 |
| CN | 206193735 U | 5/2017 |
| JP | 2013037484 A | 2/2013 |

OTHER PUBLICATIONS

May 23, 2019—(CN) First Office Action Appn 201710457046.X with English Translation.
Apr. 17, 2018—(WO) International Search Report and Written Opinion Appn PCT/CN2018/071288 with English Translation.

\* cited by examiner

FABRICATION METHOD OF PANEL, PANEL AND DISPLAY DEVICE

The application is a U.S. National Phase Entry of International Application No. PCT/CN2018/071288 filed on Jan. 4, 2018, designating the United States of America and claiming priority to Chinese Patent Application No. 201710457046.X filed on Jun. 16, 2017. The present application claims priority to and the benefit of the above-identified applications and the above-identified applications are incorporated by reference herein in their entirety.

TECHNICAL FIELD

Embodiments of the present disclosure relate to a fabrication method of a panel, a panel and a display device.

BACKGROUND

In touch control and display fields, metal materials are commonly used for fabricating electrode traces, an advantage of fabricating the electrode trace with the metal material is that the metal has high conductivity, which may reduce channel impedance, and make touch sensing more sensitive. The metal material is generally copper/aluminum. As impedance requirement becomes lower and lower, it is necessary to take pure copper/pure aluminum with higher conductivity as the material of the electrode trace, to improve electron mobility, so as to improve a product performance.

SUMMARY

At least one embodiment of the present disclosure provides a fabrication method of a panel, including: forming a first conductive layer on a base substrate by using a patterning process, the first conductive layer including a plurality of first conductive traces provided in a non-working region of the base substrate and a plurality of electrode patterns provided in a working region of the base substrate; forming a plurality of metal traces on the plurality of first conductive traces, wherein, each of the metal traces includes a connection end close to an edge of the working region of the base substrate.

For example, in the fabrication method of panel provided by an embodiment of the present disclosure, the panel includes a touch panel, the working region of the base substrate is a touch region of the base substrate, and the non-working region of the base substrate is a non-touch region of the base substrate.

For example, in the fabrication method of panel provided by an embodiment of the present disclosure, the plurality of electrode patterns includes a plurality of bridging electrodes.

For example, the fabrication method of panel provided by an embodiment of the present disclosure further includes: forming an insulating layer on the base substrate; wherein, the insulating layer covers the plurality of bridging electrodes and the connection ends of the plurality of metal traces, and a plurality of via holes are formed in the insulating layer to expose the connection ends of the plurality of metal traces.

For example, the fabrication method of panel provided by an embodiment of the present disclosure further includes: forming a second conductive layer on the base substrate by using a patterning process; wherein, the second conductive layer includes a plurality of first touch electrodes and a plurality of second touch electrodes provided in the touch region of the base substrate, and a plurality of second conductive traces provided in the non-touch region of the base substrate, the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through the bridging electrode, and the plurality of second touch electrodes are insulated from the plurality of bridging electrodes by the insulating layer, the plurality of second conductive traces are formed on the plurality of metal traces, and cover other portion in each of the plurality of metal traces other than the connection end.

For example, in the fabrication method of panel provided by an embodiment of the present disclosure, the insulating layer further covers other portion of each of the plurality of metal traces other than the connection end, and the method further includes: forming a second conductive layer on the base substrate by using a patterning process; wherein, the second conductive layer includes a plurality of first touch electrodes and a plurality of second touch electrodes provided in the touch region of the base substrate, the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through the bridging electrode, and the plurality of second touch electrodes are insulated from the plurality of bridging electrodes by the insulating layer, For example, in the fabrication method of panel provided by an embodiment of the present disclosure, the plurality of electrode patterns include a plurality of first touch electrodes, the plurality of metal traces include a plurality of first metal traces and a plurality of second metal traces, and the plurality of first touch electrodes are connected with the plurality of first metal traces.

For example, the fabrication method of panel provided by an embodiment of the present disclosure further includes: forming an insulating layer on the base substrate; wherein, the insulating layer covers a portion of the plurality of first touch electrodes and the connection ends of the plurality of metal traces, and a plurality of via holes are formed in the insulating layer to expose the connection ends of the plurality of second metal traces.

For example, the fabrication method of panel provided by an embodiment of the present disclosure further includes: forming a second conductive layer on the base substrate by using a patterning process; wherein, the second conductive layer includes a plurality of second touch electrodes provided in the touch region of the base substrate, and a plurality of second conductive traces provided in the non-touch region of the base substrate, the plurality of second touch electrodes are correspondingly connected with the plurality of second metal traces through the via holes, and the plurality of second touch electrodes are insulated from the plurality of first touch electrodes by the insulating layer, the plurality of second conductive traces are formed on the plurality of metal traces, and cover other portion of each of the plurality of metal traces other than the connection end.

For example, in the fabrication method of panel provided by an embodiment of the present disclosure, the insulating layer further covers other portion of each of the plurality of metal traces other than the connection end, and the method further includes: forming a second conductive layer on the base substrate by using a patterning process; wherein, the second conductive layer includes a plurality of second touch electrodes provided in the touch region of the base substrate, the plurality of second touch electrodes are correspondingly connected with the plurality of second metal traces through the via holes, and the plurality of second touch electrodes are insulated from the plurality of first touch electrodes by the insulating layer.

For example, in the fabrication method of panel provided by an embodiment of the present disclosure, a material of the metal trace includes copper, a copper alloy, aluminum, an aluminum alloy, gold, a gold alloy, silver, or a silver alloy.

For example, in the fabrication method of panel provided by an embodiment of the present disclosure, a material of the first conductive layer includes indium tin oxide, tin oxide, or indium zinc oxide.

For example, in the fabrication method of panel provided by an embodiment of the present disclosure, a material of the second conductive layer includes indium tin oxide, tin oxide, or indium zinc oxide.

At least one embodiment of the present disclosure provides a panel, including: a base substrate, including a working region and a non-working region, a first conductive layer provided on the base substrate, the first conductive layer including a plurality of first conductive traces provided in the non-working region of the base substrate and a plurality of electrode patterns provided in the working region of the base substrate, and a plurality of metal traces provided on the plurality of first conductive traces, wherein, each of the plurality of metal traces includes a connection end close to an edge of the working region of the base substrate.

For example, in the panel provided by an embodiment of the present disclosure, the panel includes a touch panel, the working region of the base substrate is a touch region of the base substrate, and the non-working region of the base substrate is a non-touch region of the base substrate.

For example, in the panel provided by an embodiment of the present disclosure, the plurality of electrode patterns includes a plurality of bridging electrodes.

For example, the panel provided by an embodiment of the present disclosure further includes: an insulating layer, covering the plurality of bridging electrodes and the connection ends of the plurality of metal traces, and having a plurality of via holes exposing the connection ends of the plurality of metal traces; a second conductive layer provided on the base substrate, the second conductive layer including: a plurality of second conductive traces, provided on the plurality of metal traces and covering other portion of each of the plurality of metal traces other than the connection end; and a plurality of first touch electrodes and a plurality of second touch electrodes provided in the touch region of the base substrate; wherein, the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through the bridging electrode, and the plurality of second touch electrodes are insulated from the plurality of bridging electrodes by the insulating layer.

For example, the panel provided by an embodiment of the present disclosure further includes: an insulating layer, covering the plurality of bridging electrodes and other portion of each of the plurality of metal traces other than the connection end, and having a plurality of via holes exposing the connection ends of the plurality of metal traces; a second conductive layer provided on the base substrate, the second conductive layer including a plurality of first touch electrodes and a plurality of second touch electrodes provided in the touch region of the base substrate; wherein, the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through the bridging electrode, and the plurality of second touch electrodes are insulated from the plurality of bridging electrodes by the insulating layer.

For example, in the panel provided by an embodiment of the present disclosure, the plurality of electrode patterns include a plurality of first touch electrodes, the plurality of metal traces include a plurality of first metal traces and a plurality of second metal traces, and the plurality of first touch electrodes are connected with the plurality of first metal traces.

For example, the panel provided by an embodiment of the present disclosure further includes: an insulating layer, covering a portion of the plurality of first touch electrodes and the connection ends of the plurality of metal trace, and having a plurality of via holes exposing connection ends of the plurality of second metal traces; a second conductive layer provided on the base substrate, the second conductive layer including: a plurality of second conductive traces, provided on the plurality of metal traces and covering other portion of each of the plurality of metal traces other than the connection end; and a plurality of second touch electrodes provided in the touch region of the base substrate; wherein, the plurality of second touch electrodes are correspondingly connected with the plurality of second metal traces through the via holes, and the plurality of second touch electrodes are insulated from the plurality of first touch electrodes by the insulating layer.

For example, the panel provided by an embodiment of the present disclosure further includes: an insulating layer, covering a portion of the plurality of first touch electrodes and other portion of each of the plurality of metal traces other than the connection end, and having a plurality of via holes exposing connection ends of the plurality of second metal traces; a second conductive layer provided on the base substrate, the second conductive layer including a plurality of second touch electrodes provided in the touch region of the base substrate; wherein, the plurality of second touch electrodes are correspondingly connected with the plurality of second metal traces through the via holes, and the plurality of second touch electrodes are insulated from the plurality of first touch electrodes by the insulating layer.

At least one embodiment of the present disclosure provides a display device, including any panel described above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment of the present disclosure will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms used in the present disclosure should be of general meaning as understood by those ordinarily skilled in the art. In the present disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of the described object is changed, the relative positional relationship can also be correspondingly changed.

Figure 1:
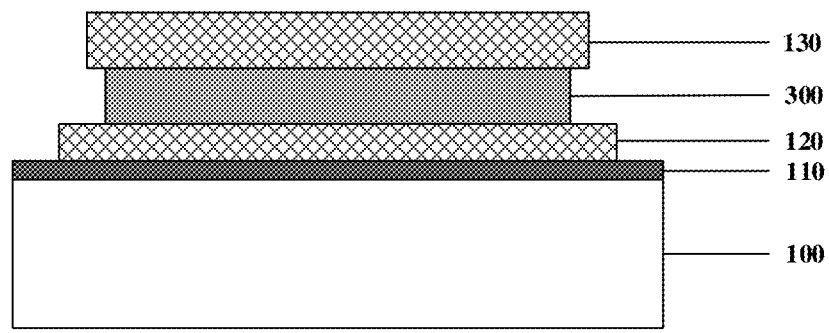
FIG. 1 is a schematic diagram of etching a metal trace multilayer structure.

In a process of preparing electrodes or leads for use in, for example, a display panel or a touch panel, with pure copper/pure aluminum, as shown in FIG. 1, in order to improve adhesion of a pure copper/pure aluminum metal layer 300, a buffer layer 120 is prepared below the pure copper/pure aluminum metal layer 300, the buffer layer can be made of a molybdenum niobium (MoNb), titanium (Ti) or copper nickel (CuNi) alloy. Meanwhile, in order to prevent the pure copper/pure aluminum metal layer from being exposed to the air to be oxidized, a protective layer 130 is prepared on the pure copper/pure aluminum metal layer 300, and the protective layer can be made of the molybdenum niobium (MoNb), titanium (Ti) or copper nickel (CuNi) alloy. The multilayer structure can solve problems of insufficient adhesion and oxidation of pure copper/pure aluminum, but it will cause difficulty in etching, and meanwhile, a problem of uneven etching may occur.

At least one embodiment of the present disclosure provides a fabrication method of a panel, including: forming a first conductive layer on a base substrate by using a patterning process, the first conductive layer including a plurality of first conductive traces provided in a non-working region of the base substrate and a plurality of electrode patterns provided in a working region of the base substrate; forming a plurality of metal traces on the plurality of first conductive traces, each of the metal traces including a connection end close to an edge of the working region of the base substrate. At least one embodiment of the present disclosure further provides a panel and a display device corresponding to the above-described fabrication method of the panel.

The fabrication method provided by the embodiment of the present disclosure may improve an effect on etching of the metal trace and improve an etching efficiency of the metal trace, without increasing the number of processes and masks, which may save process costs and mask costs.

Hereinafter, embodiments of the present disclosure and examples thereof will be described in detail in conjunction with the accompanying drawings.

An embodiment of the present disclosure provides a fabrication method of a panel, the panel including a working region and a non-working region. It should be noted that, a type of the panel is not limited in the embodiment of the present disclosure; for example, the panel can be a touch panel, in which case the working region is a touch region, and the non-working region is a non-touch region (for example, a peripheral region); for another example, the panel can be a display panel, in which case the working region is a display region, and the non-working region is a non-display region (e.g., a peripheral region). The embodiment of the present disclosure is described with a case where the panel is the touch panel as an example, and the following embodiments are the same as herein, which will not be repeated.

For example, the panel is the touch panel, the working region is the touch region, and the non-working region is the non-touch region. An electrode pattern of a touch electrode is formed in the touch region, and a lead, etc., used for the touch electrode can be formed in the non-touch region (for example, the peripheral region). As shown in FIG. 2A to FIG. 3B, the method includes operations below.

Step S20: forming a first conductive layer on a base substrate 100 by using a patterning process.

The first conductive layer includes a plurality of first conductive traces 210 provided in the non-touch region 102 of the base substrate 100 and a plurality of electrode patterns (for example, bridging electrodes 220) provided in the touch region 101 of the base substrate 100.

Step S30: forming a plurality of metal traces 300 on the plurality of first conductive traces 210.

Each metal trace 300 includes a connection end 315 close to an edge of the touch region 101 of the base substrate 100.

Figure 2A:
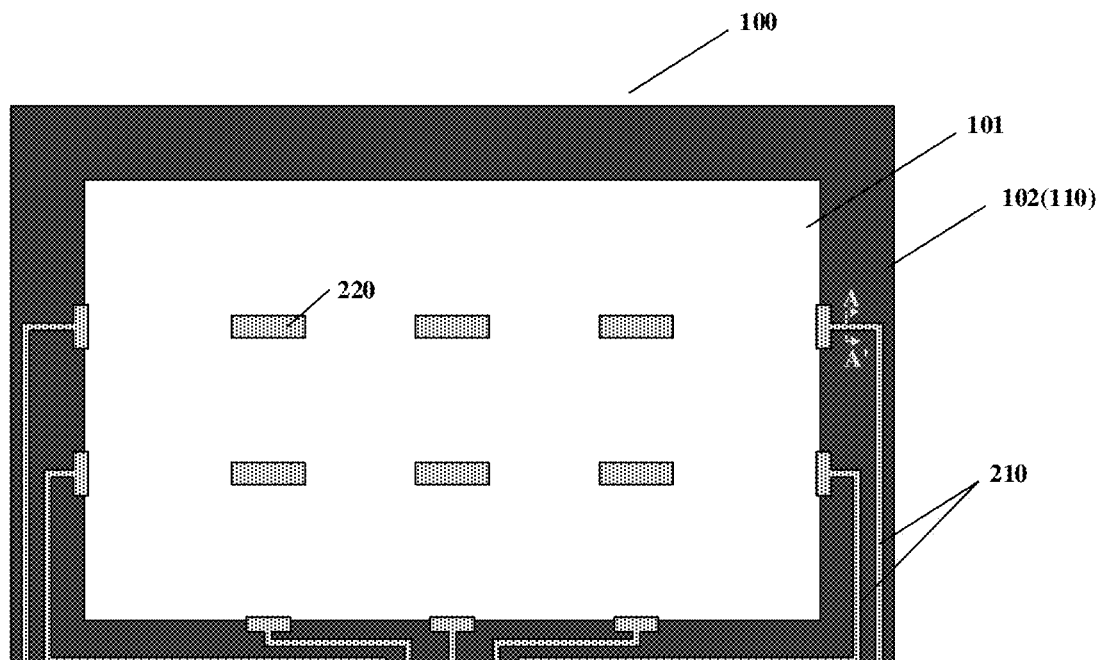
FIG. 2A is a schematic diagram of step S20 in a fabrication method of a panel provided by an embodiment of the present disclosure.
Figure 2B:
FIG. 2B is a cross-sectional view taken along line A-A' in FIG. 2A.

In step S20, for example, as shown in FIGS. 2A and 2B (FIG. 2B is a cross-sectional view taken along line A-A' in FIG. 2A), the first conductive layer is formed on the base substrate 100 by using a patterning process, for example, a first conductive layer thin film is firstly formed by using a sputtering process, and then a pattern as shown in FIG. 2A is formed by using a process such as exposure, development and etching.

For example, as shown in FIG. 2A, the first conductive layer includes the plurality of first conductive traces 210 in the non-touch region 102 of the base substrate 100, and the plurality of electrode patterns in the touch region 101 of the base substrate 100. For example, the plurality of electrode patterns are a plurality of bridging electrodes 220, and each bridging electrode 220 is used for electrically connecting touch electrodes provided adjacent to each other. It should be noted that, in this embodiment, the electrode patterns in the touch region 101 of the base substrate 100 are all described with the bridging electrodes 220 as an example.

It should be noted that, only 7 first conductive traces 210 and 6 bridging electrodes 220 are schematically shown in FIG. 2A, and the embodiments of the present disclosure include, but are not limited thereto; the number of first conductive traces and bridging electrodes can be set according to needs, and the following embodiments are the same as herein.

In the embodiment of the present disclosure, the first conductive layer can be made of a transparent conductive material, for example, the first conductive layer can be made of a material such as Indium Tin Oxide (ITO) and Tin Oxide (SnO2), for another example, the first conductive layer can be made of Indium Zinc Oxide (IZO). The embodiments of the present disclosure include, but are not limited thereto, and the following embodiments are the same as herein.

Figure 3A:
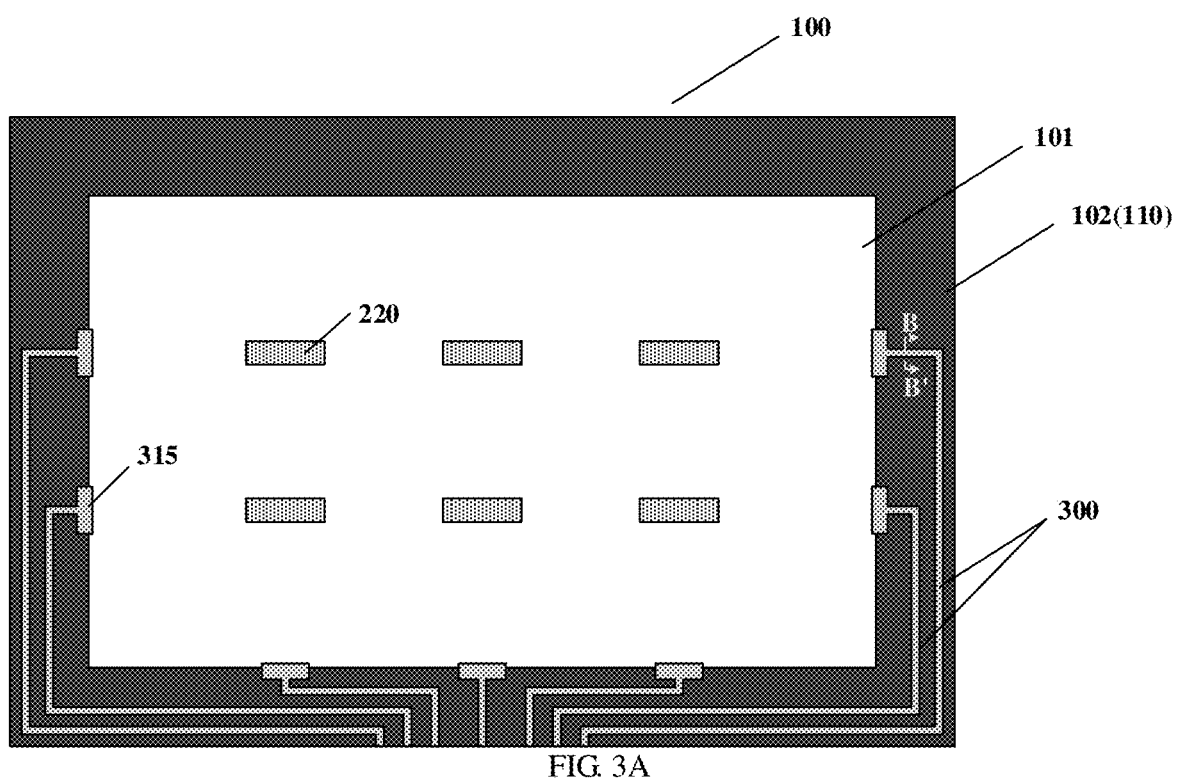
FIG. 3A is a schematic diagram of step S30 in the fabrication method of the panel provided by the embodiment of the present disclosure.
Figure 3B:
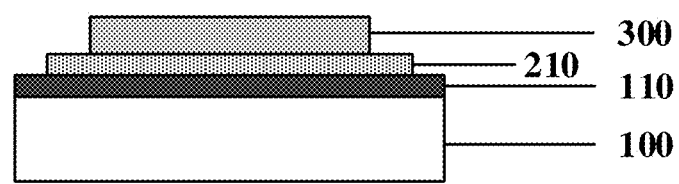
FIG. 3B is a cross-sectional view taken along line B-B' in FIG. 3A.

In step S30, for example, as shown in FIG. 3A and FIG. 3B (FIG. 3B is a cross-sectional view taken along line B-B' in FIG. 3A), the plurality of metal traces 300 are formed on the plurality of first conductive traces 210. For example, the metal trace 300 is formed on the first conductive trace 210 by using a photoetching process. Each metal trace 300 includes a connection end 315 close to the edge of the touch region 101 of the base substrate 100. The connection end 315 is configured to facilitate implementing connection of a first touch electrode and a second touch electrode formed in the touch region in subsequent steps with the metal trace 300. It should be noted that, the connection end of the metal trace shown in the diagram is only schematic, and a shape and a size thereof do not represent a true proportion. For example, a width of the connection end 315 can be greater than a width of a remaining portion of the metal trace 300; and for another example, the width of the connection end 315 can be equal to the width of the remaining portion of the metal trace 300.

In the embodiment of the present disclosure, the material of the metal trace includes one or a combination of copper, a copper alloy, aluminum, an aluminum alloy, gold, a gold alloy, silver, a silver alloy, and the like, and the following embodiments are the same as herein.

In the embodiment of the present disclosure, the first conductive trace 210 can serve as a buffer layer of the metal trace 300 formed thereon, and may improve a problem of insufficient adhesion of the metal trace 300 to the base substrate.

In this embodiment, when the metal trace is formed by etching as described above, it is only necessary to etch one layer of metal trace, whose etching effect is better than an etching effect on a multilayer metal structure. Meanwhile, etching time is short, for example, the etching time is 30 seconds, which greatly improves an etching efficiency, as compared with an etching efficiency of the multilayer metal structure (for example, 150 seconds are needed for etching a MoNb/Cu/MoNb structure).

In addition, in step S20, the bridging electrode 220 in the touch region 101 is formed, while the first conductive trace 210 is formed in the non-touch region 102, that is, the bridging electrode 220 and the first conductive trace 210 can be formed simultaneously by using a single patterning process, which, thus, may save process costs and mask costs.

Figure 4A:
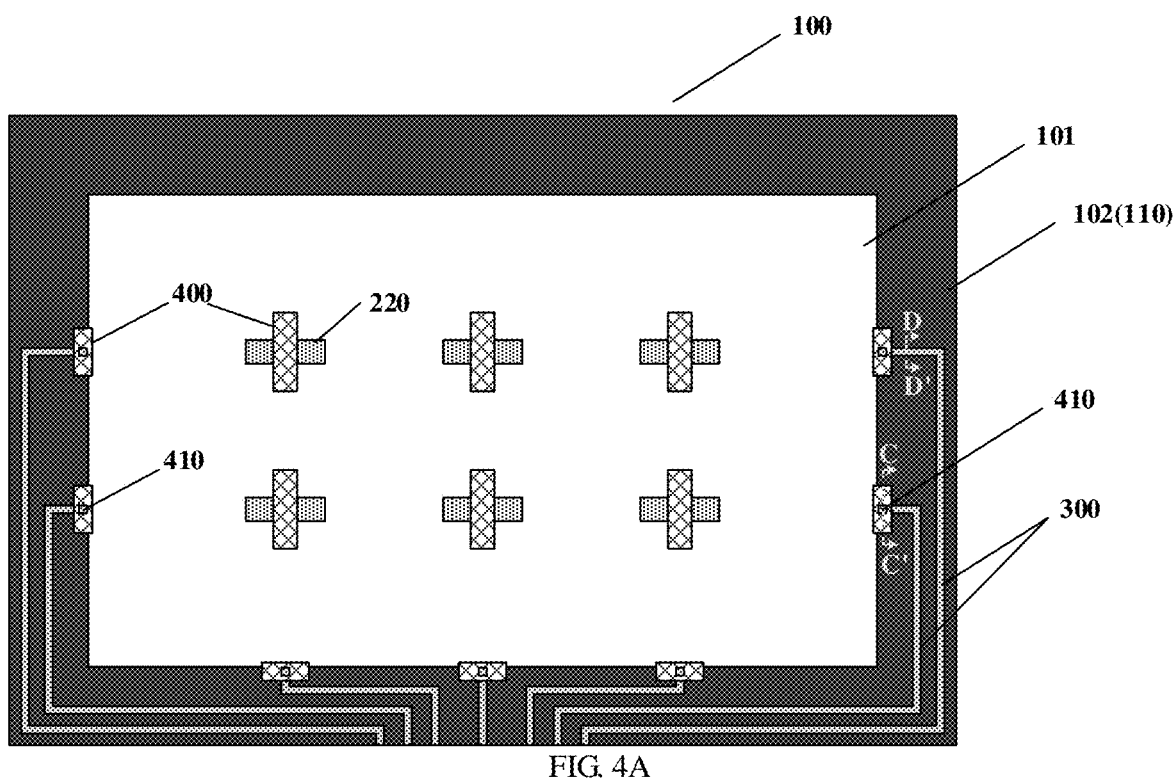
FIG. 4A is a schematic diagram of step S40 in the fabrication method of the panel provided by the embodiment of the present disclosure.
Figure 4B:
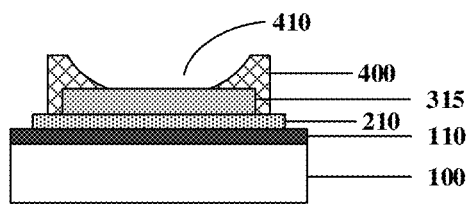
FIG. 4B is a cross-sectional view taken along line C-C' in FIG. 4A.
Figure 4C:
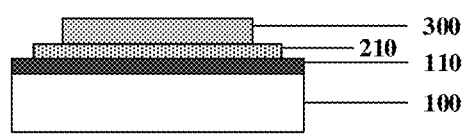
FIG. 4C is a cross-sectional view taken along line D-D' in FIG. 4A.

As shown in FIG. 4A to FIG. 4C, the fabrication method of the panel provided by this embodiment further includes operations below.

Step S40: forming an insulating layer 400 on the base substrate 100.

The insulating layer 400 covers the plurality of bridging electrodes 220 and the connection ends 315 of the plurality of metal traces 300, and a plurality of via holes 410 are formed in the insulating layer 400 to expose the connection ends 315 of the plurality of metal traces 300.

In step S40, for example, as shown in FIG. 4A, FIG. 4B and FIG. 4C (FIG. 4B is a cross-sectional view taken along line C-C' in FIG. 4A, and FIG. 4C is a cross-sectional view taken along line D-D' in FIG. 4A), the insulating layer 400 is formed on the base substrate on which the first conductive layer and the metal trace are formed by using a single patterning process.

For example, as shown in FIG. 4A and FIG. 4B, in the touch region 101, the insulating layer 400 covers a portion of the bridging electrode 220. A portion of the bridging electrode 220 that is not covered by the insulating layer 400 is used for connecting with the first touch electrode formed in a subsequent step, and the insulating layer in the touch region 101 is used for insulating the first touch electrode and the second touch electrode formed in subsequent steps from each other. In the non-touch region 102, the insulating layer 400 covers the connection end 315, and a via hole 410 is formed in each insulating layer portion covering the connection end 315 to expose the connection end 315, so that the first touch electrode and the second touch electrode formed in subsequent steps can be connected with the connection end 315 through the via hole 410, that is, connected with the metal trace 300.

Figure 5A:
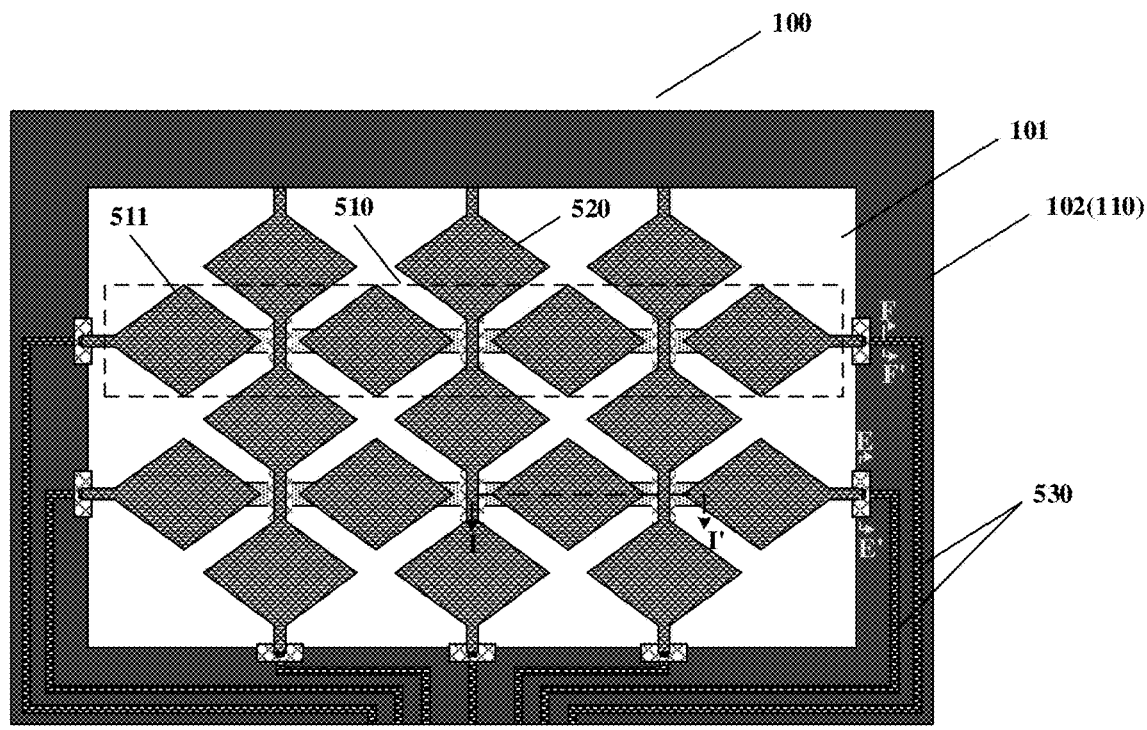
FIG. 5A is a schematic diagram of step S50 in the fabrication method of the panel provided by the embodiment of the present disclosure.
Figure 5B:
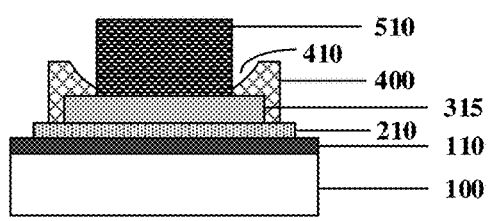
FIG. 5B is a cross-sectional view taken along line E-E' in FIG. 5A.
Figure 5C:
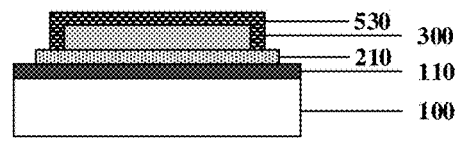
FIG. 5C is a cross-sectional view taken along line F-F' in FIG. 5A.

As shown in FIG. 5A to FIG. 5C, the fabrication method of the panel provided by this embodiment further includes operations below.

Step S50: forming a second conductive layer on the base substrate 100 by using a patterning process.

In step S50, for example, as shown in FIG. 5A, FIG. 5B and FIG. 5C (FIG. 5B is a cross-sectional view taken along line E-E' in FIG. 5A, and FIG. 5C is a cross-sectional view taken along line F-F' in FIG. 5A), the second conductive layer is formed on the base substrate on which the insulating layer 400 is formed by using a single patterning process.

For example, as shown in FIG. 5A, the second conductive layer includes a plurality of first touch electrodes 510 and a plurality of second touch electrodes 520 provided in the touch region 101 of the base substrate 100, and a plurality of second conductive traces 530 provided in the non-touch region 102 of the base substrate 100.

It should be noted that, for clarity of expression, FIG. 5A only exemplarily shows a portion of the first touch electrode 510 and a portion of the second touch electrode 520; and in order to achieve a corresponding touch effect, the first touch electrode 510 and the second touch electrode 520 should fully fill the touch region 101. The following embodiments are the same as herein.

As shown in FIG. 5A and FIG. 5B, the plurality of first touch electrodes 510 and the plurality of second touch electrodes 520 are correspondingly connected with the plurality of metal traces 300 through the via holes 410. For example, the plurality of first touch electrodes 510 and the plurality of second touch electrodes 520 are connected with the connection ends 315 through the via holes 410, that is, connected with the metal traces 300. It should be noted that, FIG. 5B only shows that the first touch electrode 510 is connected with the connection end 315 of the metal trace 300 through the via hole 410, and it is easy to understand that, the second touch electrode 520 is connected with the metal trace in a mode consistent with that in FIG. 5B.

Figure 6:
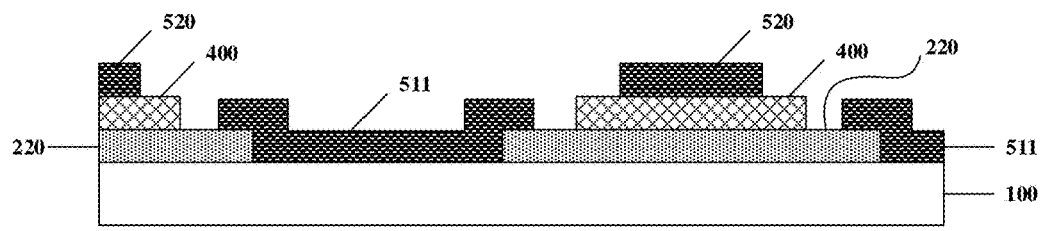
FIG. 6 is a cross-sectional view taken along line I-I' in FIG. 5A.

For example, as shown in FIG. 5A and FIG. 6 (FIG. 6 is a cross-sectional view taken along line I-I' in FIG. 5A), each first touch electrode 510 includes a plurality of first sub-electrodes 511, adjacent first sub-electrodes are connected with each other through the bridging electrode 220 formed in step S20, and the plurality of second touch electrodes 520 are insulated from the plurality of bridging electrodes 220 by the insulating layer 400 formed in the touch region 101 in step S40.

It should be noted that, FIG. 5A only exemplarily shows 4 first sub-electrodes 511, the embodiments of the present disclosure include, but are not limited thereto, the number of first sub-electrodes can be set according to needs, and the following embodiments are the same as herein.

For example, as shown in FIG. 5A and FIG. 5C, the plurality of second conductive traces 530 are formed on the plurality of metal traces 300, and the plurality of second conductive traces 530 cover other portion in each metal trace 300 other than the connection end 315.

In the embodiment of the present disclosure, the second conductive layer can be made of a transparent conductive material, for example, the second conductive layer can be made of a material such as Indium Tin Oxide (ITO) and Tin Oxide (SnO2), for another example, the second conductive layer can be made of Iridium Zinc Oxide (IZO). The embodiments of the present disclosure include, but are not limited thereto, and the following embodiments are the same as herein.

In this embodiment, the second conductive trace 530 may serve as a protective layer of the metal trace 300, to prevent the metal trace 300 from being exposed to the air, so as to avoid a metal oxidation problem.

In addition, in this embodiment, while the first touch electrode 510 and the second touch electrode 520 in the touch region 101 are formed, the second conductive trace 530 is formed in the non-touch region 102; that is, the first touch electrode 510, the second touch electrode 520 and the second conductive trace 530 can be simultaneously formed by using a single patterning process, which, thus, can save process costs and mask costs.

For example, in another embodiment of the present disclosure, as shown in FIG. 7A to FIG. 8C, this embodiment differs from the embodiments shown in FIG. 2A to FIG. 6 in that there is a difference in forming the insulating layer and the second conductive layer; steps of forming a first conductive layer and a metal trace according to this embodiment are consistent with those according to the embodiments shown in FIG. 2A to FIG. 6, which will not be repeated here; and steps of forming the insulating layer and the second conductive layer will be mainly described below.

The method can further comprise operations below, in addition to steps S20 and S30.

Step S40': forming an insulating layer 400 on a base substrate 100.

Step S50': forming a second conductive layer on the base substrate 100 by using a patterning process.

Figure 7A:
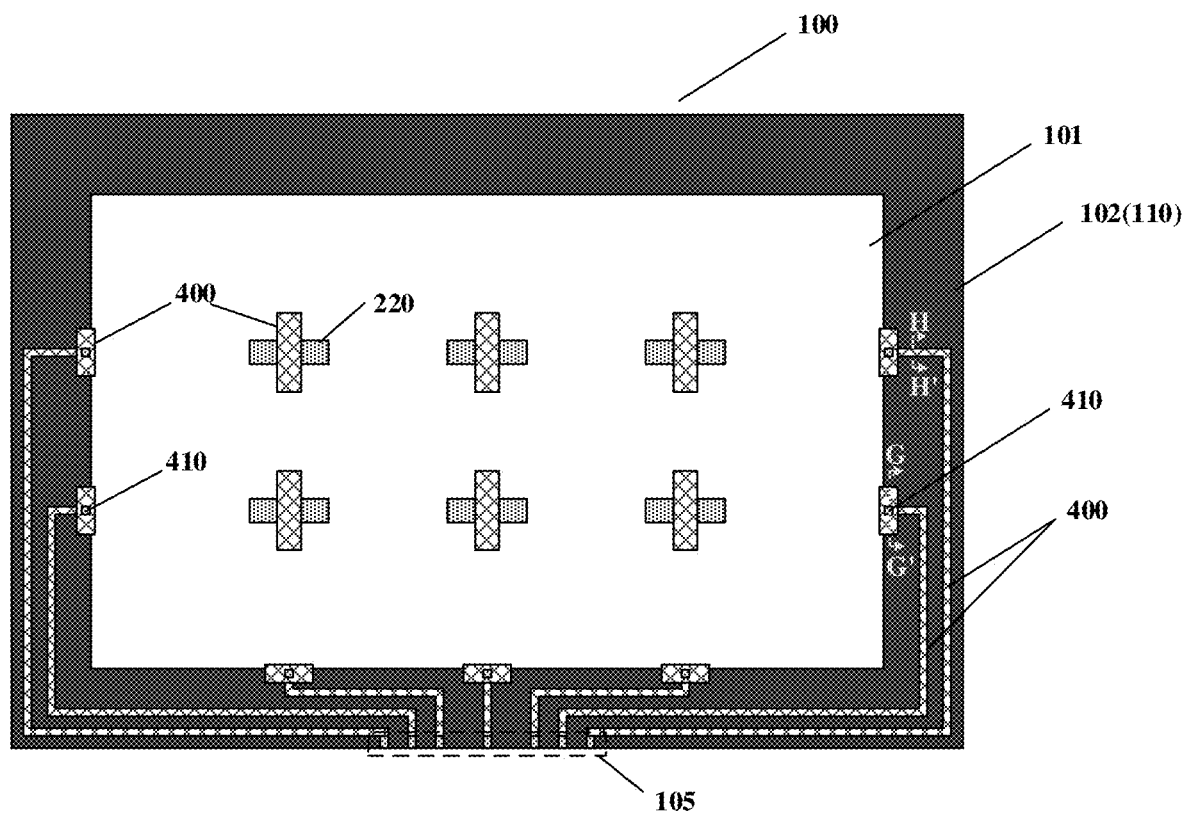
FIG. 7A is a schematic diagram of step S40' in a fabrication method of another panel provided by an embodiment of the present disclosure.
Figure 7B:
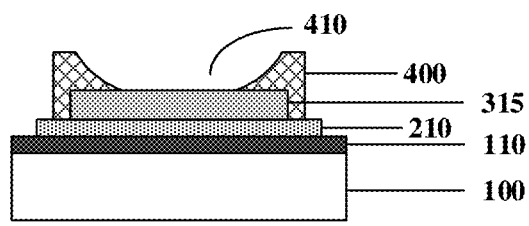
FIG. 7B is a cross-sectional view taken along line G-G' in FIG. 7A.
Figure 7C:
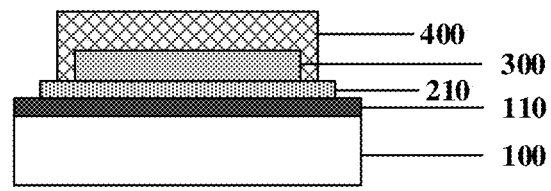
FIG. 7C is a cross-sectional view taken along line H-H' in FIG. 7A.

In step S40', for example, as shown in FIG. 7A, FIG. 7B and FIG. 7C (FIG. 7B is a cross-sectional view taken along line G-G' in FIG. 7A, and FIG. 7C is a cross-sectional view taken along line H-H' in FIG. 7A), the insulating layer 400 is formed on the base substrate on which the first conductive layer and the metal trace are formed by using a single patterning process.

For example, as shown in FIG. 7A, in a touch region 101, the insulating layer 400 covers a portion of a bridging electrode 220. The portion of the bridging electrode 220 that is not covered by the insulating layer 400 is used for connecting with a first touch electrode formed in a subsequent step, and the insulating layer in the touch region 101 is used for insulating the first touch electrode and a second touch electrode formed in subsequent steps from each other.

For example, as shown in FIG. 7A, FIG. 7B and FIG. 7C, in a non-touch region 102, the insulating layer 400 covers a metal trace 300, because the metal trace 300 is to be electrically connected with other structures in a bonding region 105 (for example, electrically connected with a touch detection chip), the insulating layer 400 does not cover the metal trace located in the bonding region 105, and the second conductive trace formed in a subsequent step will cover the metal trace in the bonding region 105. A via hole 410 is formed in the insulating layer covering each metal trace to expose the connection end 315, so that the first touch electrode and the second touch electrode formed in subsequent steps are connected with the connection end 315 through the via hole 410, that is, connected with the metal trace 300.

In this embodiment, in the non-touch region 102, the insulating layer 400 covering the metal trace 300 may serve as a protective layer of the metal trace 300, to prevent the metal trace 300 from being exposed to the air, so as to avoid a metal oxidation problem.

In addition, in this embodiment, while an insulating layer pattern in the touch region 101 is formed, the insulating layer 400 covering the metal trace 300 is formed in the non-touch region 102 to protect the metal trace, which, thus, can save process costs and mask costs.

Figure 8A:
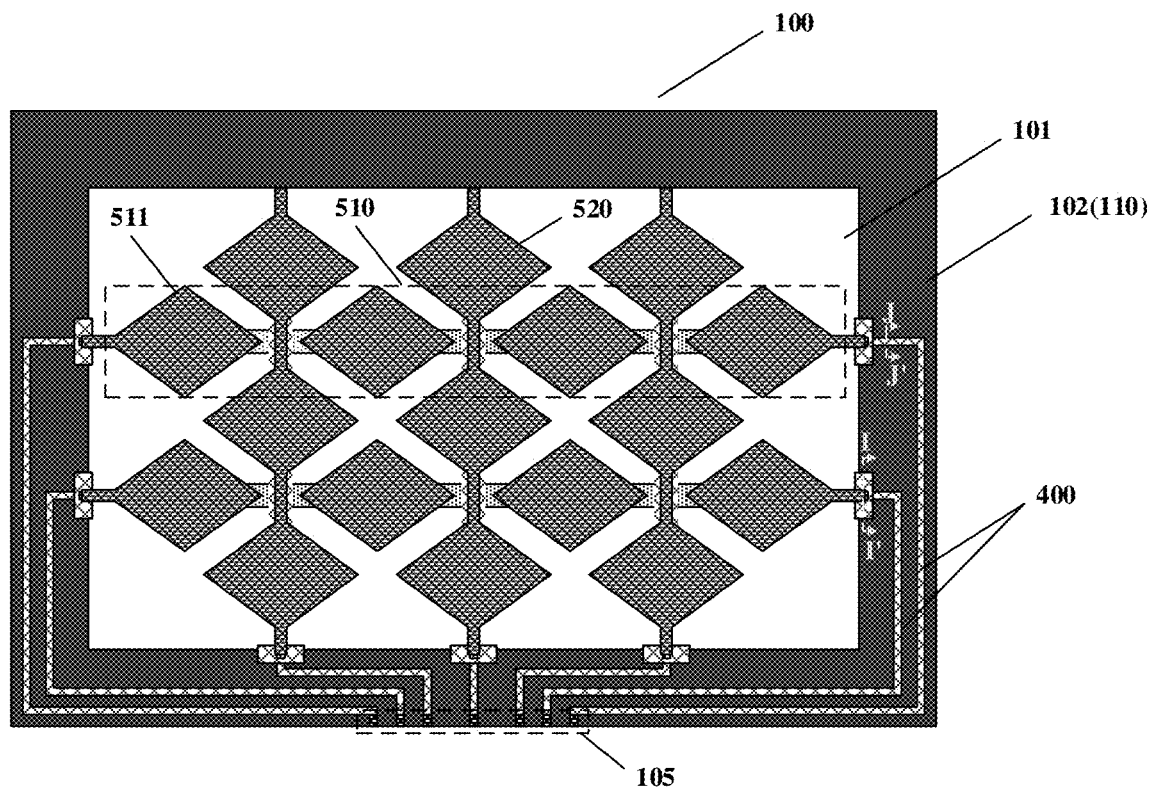
FIG. 8A is a schematic diagram of step S50' in a fabrication method of another panel provided by an embodiment of the present disclosure.
Figure 8B:
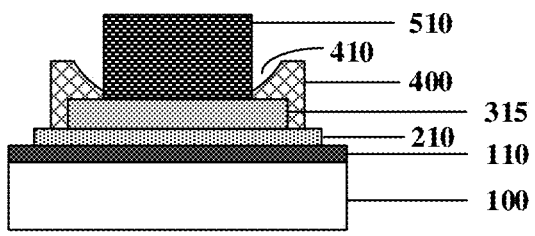
FIG. 8B is a cross-sectional view taken along line I-I' in FIG. 8A.
Figure 8C:
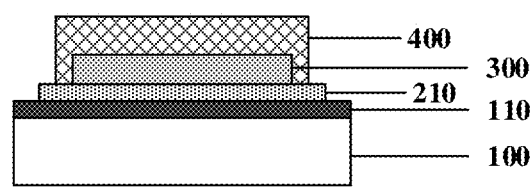
FIG. 8C is a cross-sectional view taken along line J-J' in FIG. 8A.

In step S50', for example, as shown in FIG. 8A, FIG. 8B and FIG. 8C (FIG. 8B is a cross-sectional view taken along line I-I' in FIG. 8A, and FIG. 8C is a cross-sectional view taken along line J-J' in FIG. 8A), the second conductive layer is formed on the base substrate on which the insulating layer is formed by using a single patterning process.

For example, as shown in FIG. 8A, the second conductive layer includes a plurality of first touch electrodes 510 and a plurality of second touch electrodes 520 provided in the touch region 101 of the base substrate 100. In the non-touch region 102, the second conductive layer further covers the metal trace in the bonding region 105.

As shown in FIG. 8A and FIG. 8B, the plurality of first touch electrodes 510 and the plurality of second touch electrodes 520 are correspondingly connected with a plurality of metal traces 300 through via holes 410. For example, the plurality of first touch electrodes 510 and the plurality of second touch electrodes 520 are connected with the connection ends 315 through the via holes 410, that is, connected with the metal traces 300. It should be noted that, FIG. 8B only shows that the first touch electrode 510 is connected with the connection end 315 of the metal trace 300 through the via hole 410, and it is easy to understand that, the second touch electrode 520 is connected with the metal trace in a mode consistent with that in FIG. 8B.

For example, as shown in FIG. 8A, each first touch electrode 510 includes a plurality of first sub-electrodes 511, adjacent first sub-electrodes are connected with each other through the bridging electrode 220, and the plurality of second touch electrodes 520 are insulated from a plurality of bridging electrodes 220 by the insulating layer formed in the touch region. What is shown in FIG. 6 can be referred to for a cross-sectional view at a bridge between the first touch electrode and the second touch electrode.

It should be noted that, in this embodiment, the second conductive layer further covers the metal trace in the bonding region 105, to prevent the metal trace in the bonding region 105 from being exposed to the air, so as to avoid the metal oxidation problem.

Corresponding description in the above-described embodiments can be referred to for the first conductive layer and the metal trace, which will not be repeated here.

In the embodiment of the present disclosure, the fabrication method can further comprise operations below, before the step S20.

Step S10: forming a black matrix layer 110 on the non-touch region 102 corresponding to the base substrate 100.

The non-touch region 102 corresponds to a non-display region of a display panel, so the black matrix 110 is formed in the region to block.

It should be noted that, in the embodiment of the present disclosure, the present disclosure includes, but is not limited to, modes for providing the first touch electrode and the second touch electrode as described above. For example, the second touch electrode may include a plurality of second sub-electrodes, adjacent second sub-electrodes are connected with each other through the bridging electrode, and the plurality of first touch electrodes are insulated from the plurality of bridging electrodes by the insulating layer.

An embodiment of the present disclosure further provides a fabrication method of a panel, the method differs from the above-described embodiment in that, a plurality of electrode patterns in a first conductive layer are a plurality of first touch electrodes. It should be noted that, this embodiment includes, but is not limited thereto; for example, the plurality of electrode patterns of the first conductive layer can also be second touch electrodes.

As shown in FIG. 9A to FIG. 10B, the method includes operations below.

Step S200: forming a first conductive layer on a base substrate 100 by using a patterning process.

The first conductive layer includes a plurality of first conductive traces 210 provided in a non-touch region 102 of the base substrate 100 and a plurality of electrode patterns (for example, first touch electrodes 510) provided in a touch region 101 of the base substrate 100.

Step S300: forming a plurality of metal traces on the plurality of first conductive traces 210.

Each metal trace includes a connection end 315 close to an edge of the touch region 101 of the base substrate 100, the plurality of metal traces include a plurality of first metal traces 310 and a plurality of second metal traces 320, and the plurality of first metal traces 310 are respectively connected with the plurality of first touch electrodes 510.

Figure 9A:
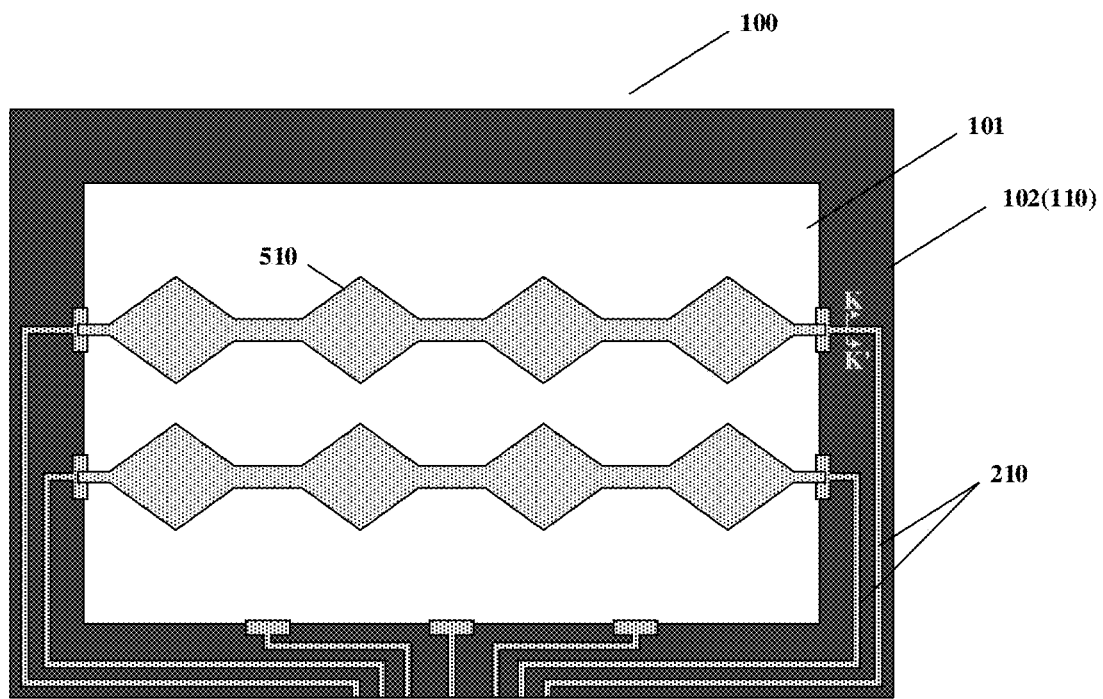
FIG. 9A is a schematic diagram of step S200 in a fabrication method of a panel provided by another embodiment of the present disclosure.
Figure 9B:
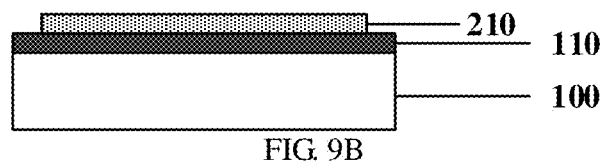
FIG. 9B is a cross-sectional view taken along line K-K' in FIG. 9A.

In step S200, for example, as shown in FIG. 9A and FIG. 9B (FIG. 9B is a cross-sectional view taken along line K-K' in FIG. 9A), the first conductive layer is formed on the base substrate 100 by using a patterning process, for example, firstly, a first conductive layer thin film is formed by using a sputtering process, and then a pattern as shown in FIG. 9A is formed by using a process such as exposure, development and etching.

For example, as shown in FIG. 9A, the first conductive layer includes the plurality of first conductive traces 210 in the non-touch region 102 of the base substrate 100, and the plurality of electrode patterns in the touch region 101 of the base substrate 100, for example, the plurality of electrode patterns can be the plurality of first touch electrodes 510. It should be noted that, in this embodiment, the electrode patterns in the touch region 101 of the base substrate 100 are all described with the first touch electrodes 510 as an example.

Figure 10A:
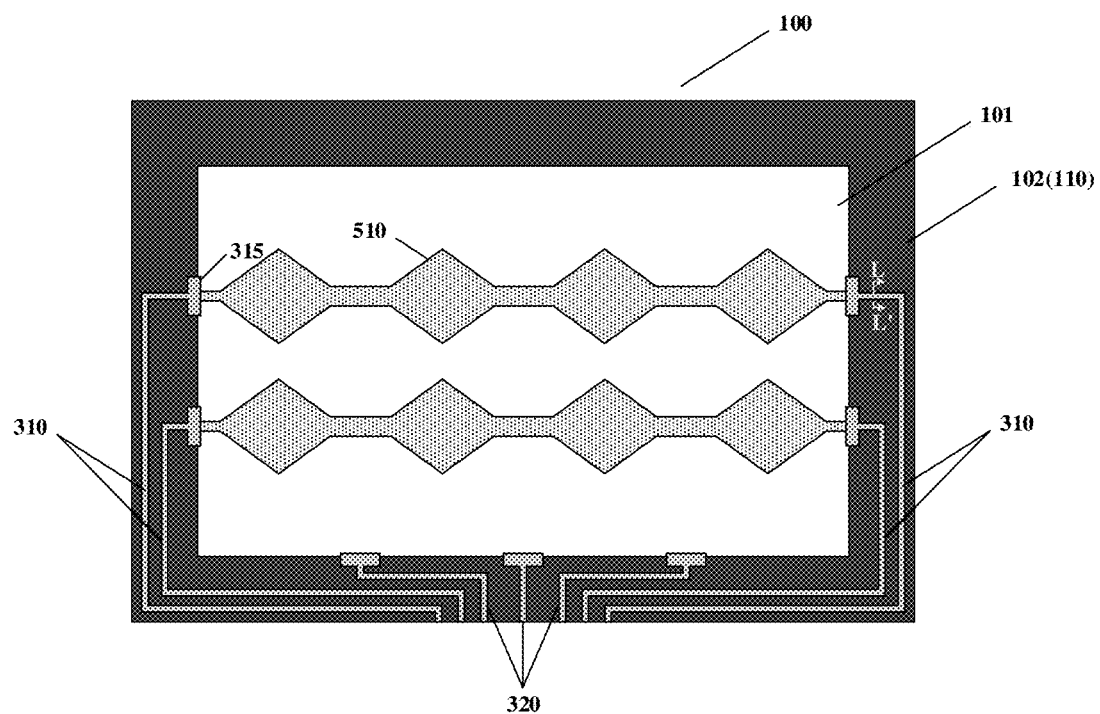
FIG. 10A is a schematic diagram of step S300 in a fabrication method of a panel provided by another embodiment of the present disclosure.
Figure 10B:
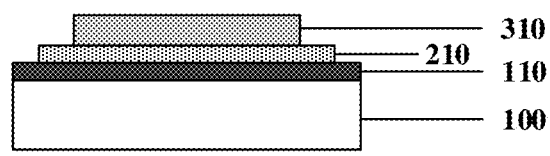
FIG. 10B is a cross-sectional view taken along line L-L' in FIG. 10A.

In step S300, for example, as shown in FIG. 10A and FIG. 10B (FIG. 10B is a cross-sectional view taken along line L-L' in FIG. 10A), the plurality of metal traces are formed on the plurality of first conductive traces 210. For example, the metal traces are formed on the first conductive traces 210 by using a photoetching process. Each metal trace 300 includes a connection end 315 close to the edge of the touch region 101 of the base substrate 100. The connection end 315 is configured to facilitate implementing connection of the first touch electrode 510 and the second touch electrode formed in a subsequent step with the metal trace. The plurality of metal traces include the plurality of first metal traces 310 and the plurality of second metal traces 320, and the plurality of first metal traces 310 are respectively connected with the plurality of first touch electrodes 510.

In the embodiment of the present disclosure, the first conductive trace 210 may serve as a buffer layer of the metal trace formed thereon, and may improve a problem of insufficient adhesion of the metal trace.

In this embodiment, when the metal trace is formed by etching as described above, it is only necessary to etch one layer of metal trace, whose etching effect is better than an etching effect on a multilayer metal structure. Meanwhile, etching time is short, for example, the etching time is 30 seconds, which greatly improves an etching efficiency, as compared with an etching efficiency of the multilayer metal structure (for example, 150 seconds are needed for etching a MoNb/Cu/MoNb structure).

In addition, in step S200, while the first touch electrode 510 in the touch region 101 is formed, the first conductive trace 210 is formed in the non-touch region 102, that is, the first touch electrode 510 and the first conductive trace 210 can be formed simultaneously by using a single patterning process, which, thus, may save process costs and mask costs.

Figure 11A:
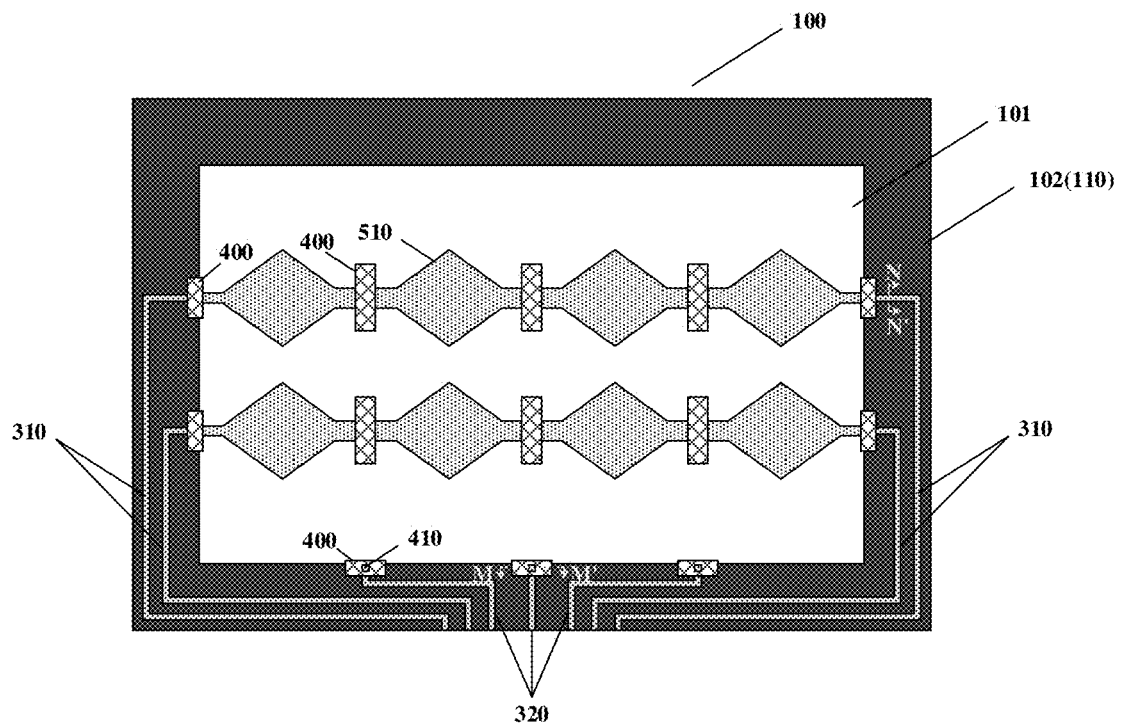
FIG. 11A is a schematic diagram of step S400 in a fabrication method of a panel provided by another embodiment of the present disclosure.
Figure 11B:
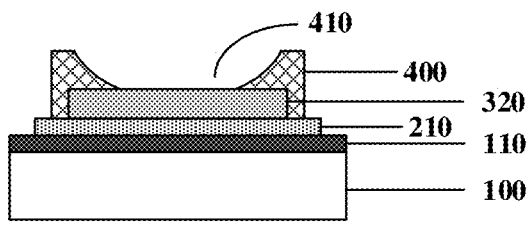
FIG. 11B is a cross-sectional view taken along line M-M' in FIG. 11A.
Figure 11C:
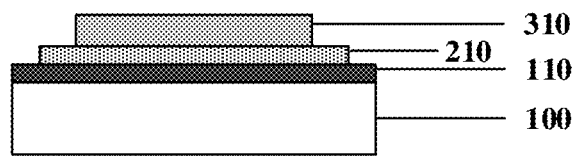
FIG. 11C is a cross-sectional view taken along line N-N' in FIG. 11A.

As shown in FIG. 11A to FIG. 11C, the fabrication method of the panel provided by this embodiment further includes operations below.

Step S400: forming the insulating layer 400 on the base substrate 100.

The insulating layer 400 covers a portion of the plurality of first touch electrodes 510 and the connection ends 315 of the plurality of metal traces, and a plurality of via holes 410 are formed in the insulating layer 400 to expose the connection ends 315 of the plurality of second metal traces 320.

In step S400, for example, as shown in FIG. 11A, FIG. 11B and FIG. 11C (FIG. 11B is a cross-sectional view taken along line M-M' in FIG. 11A, and FIG. 11C is a cross-sectional view taken along line N-N' in FIG. 11A), the insulating layer 400 is formed on the base substrate on which the first conductive layer and the metal trace are formed by using a single patterning process.

For example, as shown in FIG. 11A and FIG. 11B, in the touch region 101, the insulating layer 400 covers a bridge of the first touch electrode 510, for insulating the first touch electrode from the second ouch electrode formed in a subsequent step. In the non-touch region 102, the insulating layer 400 covers the connection end 315 of the metal trace, and a via hole 410 is formed in an insulating layer portion covering the second metal trace 320, to expose the connection end 315 of the second metal trace 320, so that the second touch electrode formed in the subsequent step is connected with the connection end 315 through the via hole 410, that is, connected with the second metal trace 320. It should be noted that, the bridge of the first touch electrode 510 refers to a region in the first touch electrode that overlaps with and is insulated from the second touch electrode formed in the subsequent step.

Figure 12A:
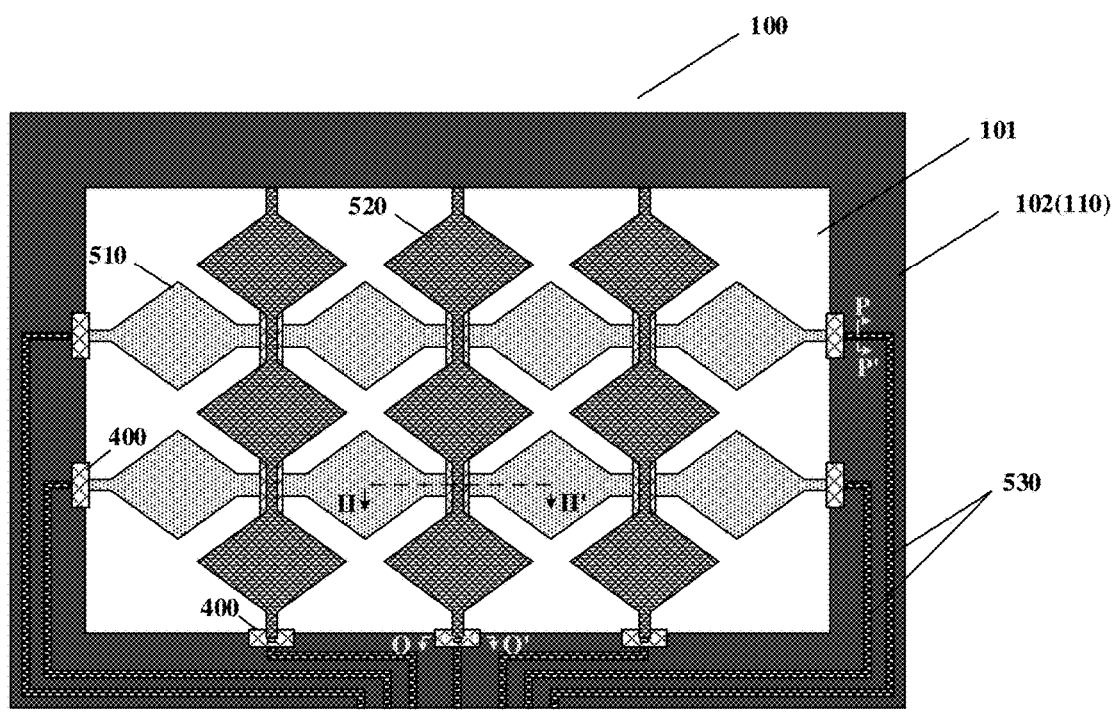
FIG. 12A is a schematic diagram of step S500 in a fabrication method of a panel provided by another embodiment of the present disclosure.
Figure 12B:
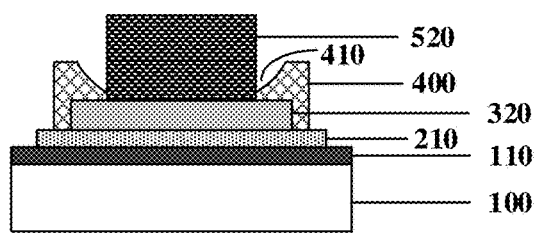
FIG. 12B is a cross-sectional view taken along line O-O' in FIG. 12A.
Figure 12C:
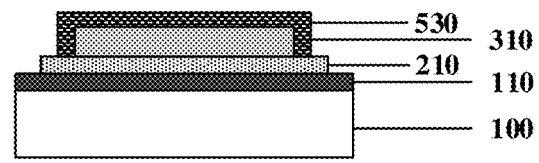
FIG. 12C is a cross-sectional view taken along line P-P' in FIG. 12A.

As shown in FIG. 12A to FIG. 12C, the fabrication method of the panel provided by this embodiment further includes operations below.

Step S500: forming a second conductive layer on the base substrate 100 by using a patterning process.

In step S500, for example, as shown in FIG. 12A, FIG. 12B and FIG. 12C (FIG. 12B is a cross-sectional view taken along line O-O' in FIG. 12A, and FIG. 12C is a cross-sectional view taken along line P-P' in FIG. 12A), the second conductive layer is formed on the base substrate on which the insulating layer is formed by using a single patterning process.

For example, as shown in FIG. 12A, the second conductive layer includes a plurality of second touch electrodes 520 provided in the touch region 101 of the base substrate 100, and a plurality of second conductive traces 530 provided in the non-touch region 102 of the base substrate 100.

As shown in FIG. 12A and FIG. 12B, the plurality of second touch electrodes 520 are correspondingly connected with the plurality of second metal traces 320 through the via holes 410.

Figure 13:
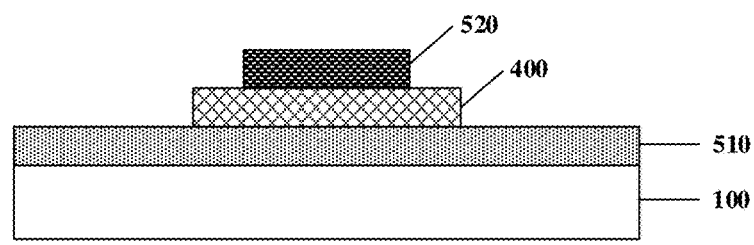
FIG. 13 is a cross-sectional view taken along line II-II' in FIG. 12A.

For example, as shown in FIG. 12A and FIG. 13 (FIG. 13 is a cross-sectional view taken along line II-II' in FIG. 12A), the plurality of second touch electrodes 520 are insulated from the plurality of first touch electrodes 510 by the insulating layer 400 formed in the touch region 101 in step S400.

For example, as shown in FIG. 12A and FIG. 12C, the plurality of second conductive traces 530 are formed on the plurality of metal traces, and the plurality of second conductive traces 530 cover other portion in each metal trace other than the connection end 315.

In this embodiment, the second conductive trace 530 may serve as a protective layer of the metal trace, to prevent the metal trace from being exposed to the air, so as to avoid a metal oxidation problem.

In addition, in this embodiment, while the second touch electrode 520 in the touch region 101 is formed, the second conductive trace 530 is formed in the non-touch region 102, that is, the second touch electrode 520 and the second conductive trace 530 can be simultaneously formed by using a single patterning process, which, thus, may save process costs and mask costs.

For example, in another embodiment of the present disclosure, as shown in FIG. 14A to FIG. 15C, this embodiment differs from the embodiments shown in FIG. 9A to FIG. 13 in that there is a difference in forming the insulating layer and the second conductive layer; steps of forming a first conductive layer and a metal trace in this embodiment are consistent with those in the embodiments shown in FIG. 9A to FIG. 13, which will not be repeated here; and steps of forming the insulating layer and the second conductive layer will be mainly described below.

The method may further comprise operations below, in addition to steps S200 and S300.

Step S400': forming an insulating layer 400 on a base substrate 100.

Step S500': forming a second conductive layer on the base substrate 100 by using a patterning process.

Figure 14A:
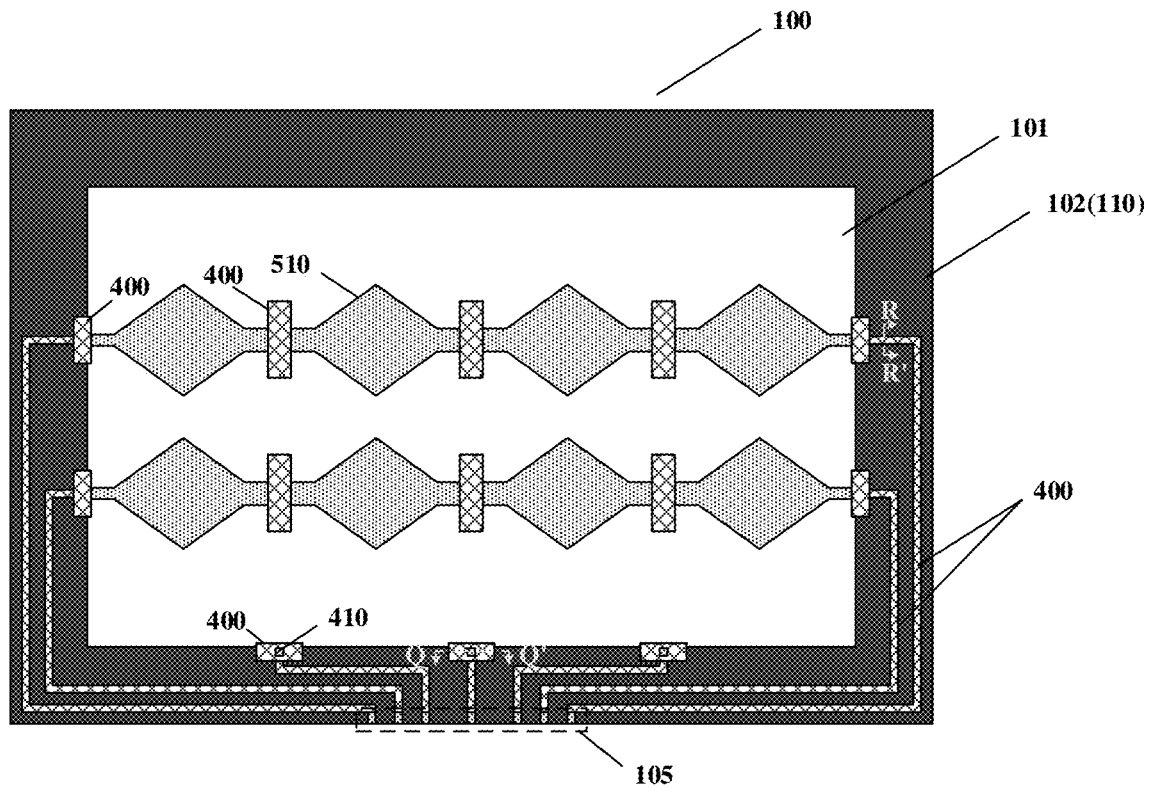
FIG. 14A is a schematic diagram of step S400' in a fabrication method of another panel provided by another embodiment of the present disclosure.
Figure 14B:
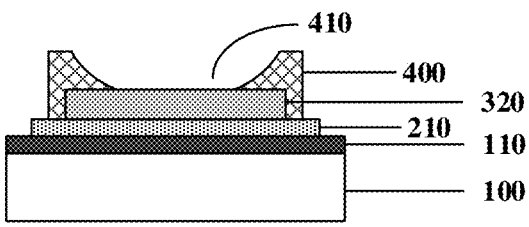
FIG. 14B is a cross-sectional view taken along line Q-Q' in FIG. 14A.
Figure 14C:
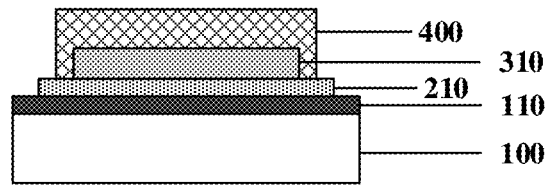
FIG. 14C is a cross-sectional view taken along line R-R' in FIG. 14A.

In step S400', for example, as shown in FIG. 14A, FIG. 14B and FIG. 14C (FIG. 14B is a cross-sectional view taken along line Q-Q' in FIG. 14A, and FIG. 14C is a cross-sectional view taken along line R-R' in FIG. 14A), the insulating layer 400 is formed on the base substrate on which the first conductive layer and the metal trace are formed by using a single patterning process.

For example, as shown in FIG. 14A, FIG. 14B and FIG. 14C, in a touch region 101, the insulating layer 400 covers a bridge of a first touch electrode 510, for insulating the first touch electrode from a second ouch electrode formed in a subsequent step. In a non-touch region 102, the insulating layer 400 covers the metal trace; because the metal trace 300 is to be electrically connected with other structures in a bonding region 105 (for example, electrically connected with a touch detection chip), the insulating layer 400 does not cover the metal trace located in the bonding region 105, and a second conductive trace formed in a subsequent step will cover the metal trace in the bonding region 105. A via hole 410 is formed in the insulating layer covering a second metal trace 320 to expose a connection end of the second metal trace 320, so that the second touch electrode formed in the subsequent step is connected with the connection end through the via hole 410, that is, connected with the second metal trace 320.

In this embodiment, in the non-touch region 102, the insulating layer 400 covering the metal trace may serve as a protective layer of the metal trace, to prevent the metal trace from being exposed to the air, so as to avoid a metal oxidation problem.

In addition, in this embodiment, while an insulating layer pattern in the touch region 101 is formed, the insulating layer 400 covering the metal trace is formed in the non-touch region 102 to protect the metal trace, which, thus, may save process costs and mask costs.

Figure 15A:
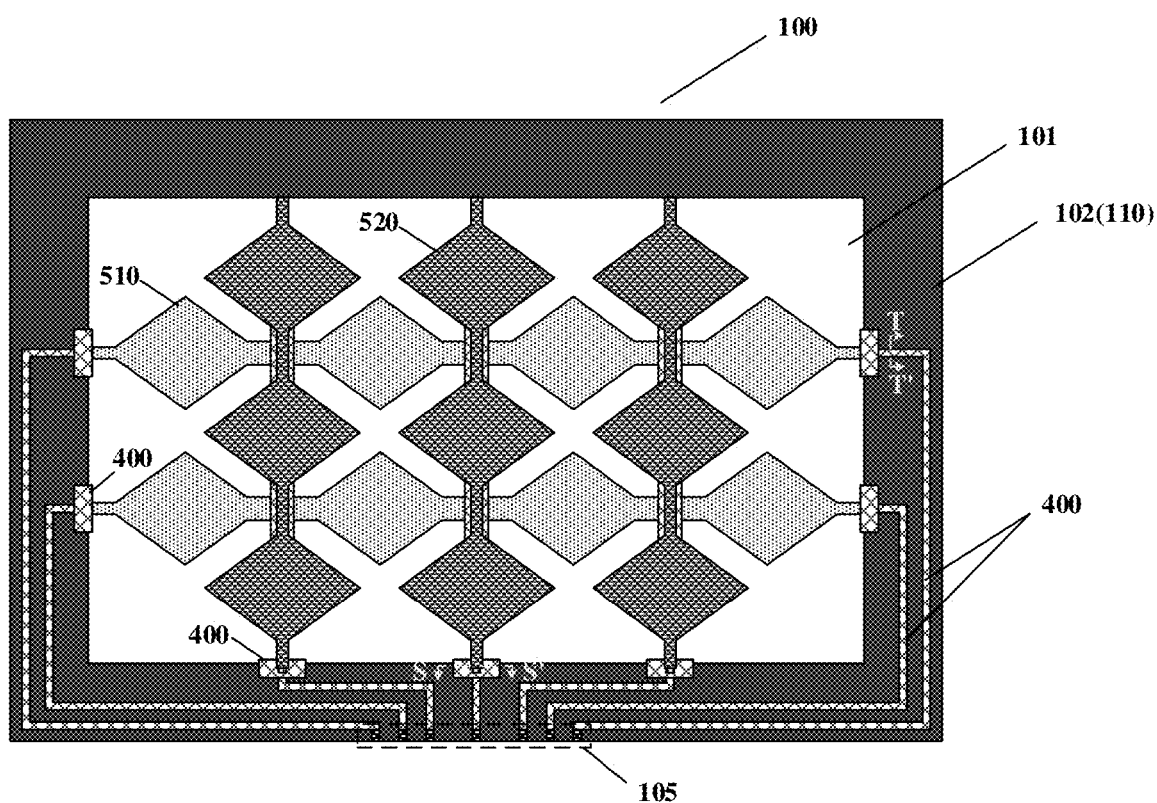
FIG. 15A is a schematic diagram of step S500' in a fabrication method of another panel provided by another embodiment of the present disclosure.
Figure 15B:
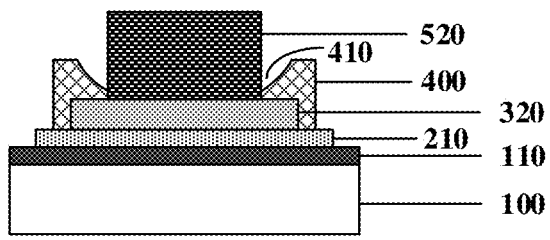
FIG. 15B is a cross-sectional view taken along line S-S' in FIG. 15A.
Figure 15C:
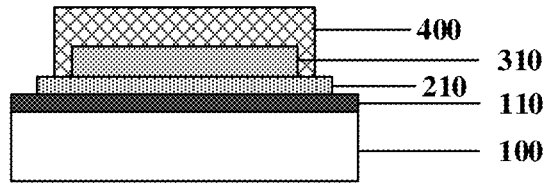
FIG. 15C is a cross-sectional view taken along line T-T' in FIG. 15A.

In step S500', for example, as shown in FIG. 15A, FIG. 15B and FIG. 15C (FIG. 15B is a cross-sectional view taken along line S-S' in FIG. 15A, and FIG. 15C is a cross-sectional view taken along line T-T' in FIG. 15A), the second conductive layer is formed on the base substrate on which the insulating layer is formed by a single patterning process.

For example, as shown in FIG. 15A, the second conductive layer includes a plurality of second touch electrodes 520 provided in the touch region 101 of the base substrate 100. In the non-touch region 102, the second conductive layer further covers the metal trace in the bonding region 105.

As shown in FIG. 15A and FIG. 15B, the plurality of second touch electrodes 520 are correspondingly connected with the plurality of metal traces 300 through via holes 410.

For example, as shown in FIG. 15A, the plurality of second touch electrodes 520 are insulated from a plurality of first touch electrodes 510 by the insulating layer formed in the touch region 101. What is shown in FIG. 13 can be referred to for a cross-sectional view at a bridge between the first touch electrode and the second touch electrode in this embodiment.

It should be noted that, in this embodiment, the second conductive layer further covers the metal trace in the bonding region 105, to prevent the metal trace in the bonding region 105 from being exposed to the air, so as to avoid the metal oxidation problem.

Corresponding description in the above-described embodiments can be referred to for the first conductive layer and the metal trace, which will not be repeated here.

In the embodiment of the present disclosure, the fabrication method may further comprise operations below, before step S200.

Step S100: forming a black matrix layer 110 on the non-touch region 102 corresponding to the base substrate 100.

The non-touch region 102 corresponds to a non-display region of a display panel, so the black matrix 110 is formed in the region to block.

An embodiment of the present disclosure further provides a panel, and the panel is formed by using the fabrication method according to the embodiments shown in FIG. 2A to FIG. 6.

As shown in FIG. 2A and FIG. 3A, the panel includes: a base substrate 100, a first conductive layer provided on the base substrate 100, and a plurality of metal traces 300 provided on a plurality of first conductive traces 210.

The base substrate 100 includes a touch region 101 and a non-touch region 102; the first conductive layer includes the plurality of first conductive traces 210 provided in the non-touch region 102 of the base substrate 100 and a plurality of electrode patterns provided in the touch region 101 of the base substrate 100; each metal trace 300 includes a connection end 315 close to an edge of the touch region 101 of the base substrate 100.

For example, as shown in FIG. 2A, the plurality of electrode patterns in the touch region 101 can be a plurality of bridging electrodes 220.

For example, as shown in FIG. 4A and FIG. 5A, the panel provided by this embodiment further includes an insulating layer 400 and a second conductive layer provided on the base substrate 100.

For example, as shown in FIG. 4A, the insulating layer 400 covers the plurality of bridging electrodes 220 and the connection ends 315 of the plurality of metal traces 300, and has a plurality of via holes 410 exposing the connection ends 315 of the plurality of metal traces 300.

For example, as shown in FIG. 5A and FIG. 5B, the second conductive layer includes a plurality of second conductive traces 530 provided on the plurality of metal traces 300, and a plurality of first touch electrodes 510 and a plurality of second touch electrodes 520 provided in the touch region 101 of the base substrate 100. The plurality of second conductive traces 530 cover other portion of each metal trace 300 other than the connection end 315. The plurality of first touch electrodes 510 and the plurality of second touch electrodes 520 are correspondingly connected with the plurality of metal traces 300 through the via holes 410.

As shown in FIG. 5A and FIG. 6 (FIG. 6 is a cross-sectional view taken along line I-I' in FIG. 5A), each first touch electrode 510 includes a plurality of first sub-electrodes 511, adjacent first sub-electrodes are connected with each other through the bridging electrode 220, and the plurality of second touch electrodes 520 are insulated from the plurality of bridging electrodes 220 by the insulating layer 400 provided in the touch region 101.

For example, another embodiment of the present disclosure further provides a panel, as shown in FIG. 7A to FIG. 8C, this embodiment differs from the above-described embodiments in that there is a difference in the insulating layer and the second conductive layer of the panel, a first conductive layer and a metal trace according to this embodiment are consistent with those according to the above-described embodiments, which will not be repeated here.

The panel further includes an insulating layer 400 and a second conductive layer provided on the base substrate 100 in addition to the first conductive layer and the metal trace.

For example, as shown in FIG. 7A and FIG. 7B, the insulating layer 400 covers a plurality of bridging electrodes 220 and a plurality of metal traces 300, and has a plurality of via holes 410 exposing connection ends 315 of the plurality of metal traces 300.

For example, as shown in FIG. 8A and FIG. 8B, the second conductive layer includes a plurality of first touch electrodes 510 and a plurality of second touch electrodes 520 provided in a touch region 101 of the base substrate 100. The plurality of first touch electrodes 510 and the plurality of second touch electrodes 520 are correspondingly connected with the plurality of metal traces 300 through the via holes 410.

As shown in FIG. 8A, each first touch electrode 510 includes a plurality of first sub-electrodes 511, adjacent first sub-electrodes are connected with each other through the bridging electrode 220, and the plurality of second touch electrodes 520 are insulated from the plurality of bridging electrodes 220 by the insulating layer formed in the touch region 101. What is shown in FIG. 6 can be referred to for a cross-sectional view at a bridge between the first touch electrode and the second touch electrode.

It should be noted that, in this embodiment, the present disclosure includes, but is not limited to, modes for providing the first touch electrode and the second touch electrode as described above. For example, the second touch electrode may include a plurality of second sub-electrodes, adjacent second sub-electrodes are connected with each other through the bridging electrode, and the plurality of first touch electrodes are insulated from the plurality of bridging electrodes by the insulating layer covering the bridging electrode, that is, insulated from the second touch electrodes.

The panel provided by this embodiment may further comprise a touch detection chip, and the first touch electrode and the second touch electrode are connected with the touch detection chip through the metal trace, so as to implement a touch function.

Another embodiment of the present disclosure further provides a panel, and the panel is formed by using the fabrication method according to the embodiments shown in FIG. 9A to FIG. 13. This embodiment differs from the above-described embodiments in that, a plurality of electrode patterns in a first conductive layer are first touch electrodes. It should be noted that, this embodiment includes, but is not limited thereto, for example, the plurality of electrode patterns in the first conductive layer may further be second touch electrodes.

As shown in FIG. 9A and FIG. 10A, the panel includes: a base substrate 100, a first conductive layer provided on the base substrate 100, and a plurality of metal traces provided on a plurality of first conductive traces 210.

The base substrate 100 includes a touch region 101 and a non-touch region 102; the first conductive layer includes the plurality of first conductive traces 210 provided in the non-touch region 102 of the base substrate 100 and the plurality of first touch electrodes provided in the touch region 101 of the base substrate 100; each metal trace includes a connection end 315 close to an edge of the touch region 101 of the base substrate 100; the plurality of metal traces include a plurality of first metal traces 310 and a plurality of second metal traces 320, and the plurality of first metal traces 310 and the plurality of first touch electrodes 510 are connected.

For example, as shown in FIG. 11A and FIG. 12A, the panel provided by this embodiment may further comprise an insulating layer 400 and a second conductive layer provided on the base substrate 100.

For example, as shown in FIG. 11A, the insulating layer 400 covers a bridge of the first touch electrode 510 and connection ends 315 of the plurality of metal traces, and the insulating layer 400 has a plurality of via holes 410 exposing connection ends of the plurality of second metal traces 320.

For example, as shown in FIG. 12A and FIG. 12B, the second conductive layer includes a plurality of second conductive traces 530 provided on the plurality of metal traces 300, and a plurality of second touch electrodes 520 provided in the touch region 101 of the base substrate 100. The plurality of second conductive traces 530 cover other portion of each metal trace 300 other than the connection end 315. The plurality of second touch electrodes 520 are correspondingly connected with the plurality of second metal traces 300 through the via holes 410.

As shown in FIG. 12A and FIG. 13 (FIG. 13 is a cross-sectional view taken along line II-II' in FIG. 12A), the plurality of second touch electrodes 520 are insulated from the plurality of first touch electrodes 510 by the insulating layer formed in the touch region 101.

For example, another embodiment of the present disclosure further provides a panel, as shown in FIG. 14A to FIG. 15C, this embodiment differs from the above-described embodiments in that there is a difference in arrangement of the insulating layer and the second conductive layer, and a first conductive layer and a metal trace according to this embodiment are consistent with those according to the above-described embodiments, which will not be repeated here.

The panel further includes an insulating layer 400 and a second conductive layer provided on a base substrate 100 in addition to the first conductive layer and the metal trace.

For example, as shown in FIG. 14A and FIG. 14B, the insulating layer 400 covers a bridge of a first touch electrode 510 and a plurality of metal traces, and has a plurality of via holes 410 exposing connection ends of a plurality of second metal traces 320.

For example, as shown in FIG. 15A and FIG. 15B, the second conductive layer includes a plurality of second touch electrodes 520 provided in a touch region 101 of the base substrate 100, and the plurality of second touch electrodes 520 are correspondingly connected with the plurality of second metal traces 320 through the via holes 410.

As shown in FIG. 15A, the plurality of second touch electrodes 520 are insulated from s plurality of first touch electrodes 510 by the insulating layer formed in the touch region 101. What is shown in FIG. 13 can be referred to for a cross-sectional view at a bridge between the first touch electrode and the second touch electrode according to this embodiment.

The panel provided by this embodiment may further comprise a touch detection chip, and the first touch electrodes and the second touch electrodes are connected with the touch detection chip through the metal trace, so as to implement a touch function.

It should be noted that, the panel provided by the embodiment of the present disclosure is formed correspondingly by using the fabrication method provided by the embodiment of the present disclosure, and corresponding description of the fabrication method according to the embodiment of the present disclosure can be referred to for a structure and a technical effect of the panel, which will not be repeated here.

An embodiment of the present disclosure further provides a display device, including the panel according to any one of the above-described embodiments.

It should be noted that, a type of the panel is not limited in the embodiment of the present disclosure, for example, the panel can be a touch panel; and for another example, the panel can be a display panel. In this embodiment, description is provided with a case where the panel is a touch panel as an example.

For example, the panel is a touch panel, and the display device provided by this embodiment may further comprise a display screen. It should be noted that, a mode of combining the touch panel and the display screen will not be limited in this embodiment.

For example, the base substrate can be a protective cover plate, the protective cover plate is used for covering on the display screen to protect the display screen, and a side of the protective cover plate on which the touch panel is formed faces the display screen. That is, the touch panel and the display screen are combined in a One Glass Solution (OGS) mode.

For another example, the base substrate can also be a color filter substrate, the color filter substrate is used for cell-assembling with an array substrate, the touch panel is provided on a side of the color filter substrate facing away from the array substrate, and a polarizer is further provided on a side of the touch panel facing away from the color filter substrate. That is, the touch panel and the display screen are combined in an On-Cell mode.

For another example, the base substrate can also be the color filter substrate, the color filter substrate is used for cell-assembling with the array substrate, and the touch panel is provided on a side of the color filter substrate facing the array substrate. That is, the touch panel and the display screen are combined in an In-Cell (in-line) mode.

It should be noted that, the display device according to this embodiment can be: a liquid crystal panel, a liquid crystal television, a monitor, an OLED panel, an OLED television, E-paper, a mobile phone, a tablet personal computer, a laptop, a digital photo frame, a navigator, and any other product or component having a touch display function.

Corresponding description in any one of the above-described embodiments can be referred to for a technical effect of the display device provided by this embodiment, which will not be repeated here.

In summary, the fabrication method of the panel, the panel and the display device provided by the embodiments of the present disclosure have at least one of beneficial effects below.

(1) In at least one embodiment of the present disclosure, when the metal trace is formed by etching, it is only necessary to etch one layer of metal trace, whose etching effect is better than the etching effect on the multilayer metal structure (for example, etching the MoNb/Cu/MoNb structure). Meanwhile, the etching time is short as compared with that of the multilayer metal structure, which greatly improves the etching efficiency.

(2) In at least one embodiment, while the electrode pattern (for example, the bridging electrode or the touch electrode) in the touch region is formed, the first conductive trace is formed in the non-touch region, which, thus, may save process costs and mask costs.

(3) In at least one embodiment, while the touch electrode in the touch region is formed, the second conductive trace is formed in the non-touch region, which, thus, may save process costs and mask costs.

(4) In at least one embodiment, while the insulating layer pattern in the touch region is formed, the protective layer covering the metal trace is formed in the non-touch region, which, thus, may save process costs and mask costs.

(5) In at least one embodiment, the first conductive trace may serve as the buffer layer of the metal trace formed thereon, and may improve the problem of insufficient adhesion of the metal trace.

(6) In at least one embodiment, the second conductive trace may serve as the protective layer of the metal trace, to prevent the metal trace from being exposed to the air, so as to avoid the metal oxidation problem.

(7) In at least one embodiment, in the non-touch region, the insulating layer may serve as the protective layer of the metal trace to cover the metal trace, to prevent the metal trace from being exposed to the air, so as to avoid the metal oxidation problem.

The above are only specific embodiments of the present disclosure, but the scope of the embodiment of the present disclosure is not limited thereto, and the scope of the present disclosure should be the scope of the following claims.

The invention claimed is:

1. A fabrication method of a panel, comprising:
   forming a first conductive layer on a base substrate by using a patterning process, the first conductive layer including a plurality of first conductive traces provided in a non-working region of the base substrate and a plurality of electrode patterns provided in a working region of the base substrate;
   forming a plurality of metal traces on the plurality of first conductive traces, wherein each of the metal traces includes a connection end close to an edge of the working region of the base substrate; and
   forming an insulating layer on the base substrate,
   wherein the plurality of electrode patterns includes a plurality of bridging electrodes, the insulating layer covers the plurality of bridging electrodes and connection ends of the plurality of metal traces, and wherein a plurality of via holes are formed in the insulating layer to expose the connection ends of the plurality of metal traces.

2. The fabrication method according to claim 1, wherein the panel comprises a touch panel, the working region of the base substrate is a touch region of the base substrate, and the non-working region of the base substrate is a non-touch region of the base substrate.

3. The fabrication method according to claim 2, further comprising:
   forming a second conductive layer on the base substrate by using a patterning process, wherein
   the second conductive layer includes a plurality of first touch electrodes and a plurality of second touch electrodes provided in the touch region of the base substrate, and a plurality of second conductive traces provided in the non-touch region of the base substrate,
   the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through a corresponding bridging electrode, and the plurality of second touch electrodes is insulated from the plurality of bridging electrodes by the insulating layer, and
   the plurality of second conductive traces is formed on the plurality of metal traces, and cover portions of each of the plurality of metal traces other than the connection ends.

4. The fabrication method according to claim 2, wherein the insulating layer further covers portions of each of the plurality of metal traces other than the connection ends, and the method further comprises:
   forming a second conductive layer on the base substrate by using a patterning process, wherein
   the second conductive layer includes a plurality of first touch electrodes and a plurality of second touch electrodes provided in the touch region of the base substrate, and
   the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through a corresponding bridging electrode, and the plurality of second touch electrodes is insulated from the plurality of bridging electrodes by the insulating layer.

5. The fabrication method according to claim 2, wherein the plurality of electrode patterns includes a plurality of first touch electrodes, the plurality of metal traces includes a plurality of first metal traces and a plurality of second metal traces, and the plurality of first touch electrodes is connected with the plurality of first metal traces.

6. The fabrication method according to claim 5, further comprising:
   forming an insulating layer on the base substrate, wherein
   the insulating layer covers a portion of the plurality of first touch electrodes and the connection ends of the plurality of metal traces, and a plurality of via holes is formed in the insulating layer to expose connection ends of the plurality of second metal traces.

7. The fabrication method according to claim 6, further comprising:
   forming a second conductive layer on the base substrate by using a patterning process, wherein the second conductive layer includes a plurality of second touch electrodes provided in the touch region of the base substrate, and a plurality of second conductive traces provided in the non-touch region of the base substrate, the plurality of second touch electrodes is correspondingly connected with the plurality of second metal traces through the via holes, and the plurality of second touch electrodes is insulated from the plurality of first touch electrodes by the insulating layer, and the plurality of second conductive traces is formed on the plurality of metal traces, and cover portions of each of the plurality of metal traces other than the connection ends.

8. The fabrication method according to claim 6, wherein the insulating layer further covers portions of each of the plurality of metal traces other than the connection ends, and the method further comprises:

forming a second conductive layer on the base substrate by using a patterning process, wherein the second conductive layer includes a plurality of second touch electrodes provided in the touch region of the base substrate, and the plurality of second touch electrodes is correspondingly connected with the plurality of second metal traces through the via holes, and the plurality of second touch electrodes is insulated from the plurality of first touch electrodes by the insulating layer.

9. The fabrication method according to claim 1, wherein the plurality of metal traces includes a material selected from the group consisting of copper, a copper alloy, aluminum, an aluminum alloy, gold, a gold alloy, silver, and a silver alloy.

10. A panel, comprising:
a base substrate, including a working region and a non-working region;
a first conductive layer provided on the base substrate, the first conductive layer including a plurality of first conductive traces provided in the non-working region of the base substrate and a plurality of electrode patterns provided in the working region of the base substrates;
a plurality of metal traces provided on the plurality of first conductive traces, wherein each of the plurality of metal traces includes a connection end close to an edge of the working region of the base substrate; and
an insulating layer on the base substrate,
wherein the plurality of electrode patterns includes a plurality of bridging electrodes, the insulating layer covers the plurality of bridging electrodes and connection ends of the plurality of metal traces, and a plurality of via holes are formed in the insulating layer to expose the connection ends of the plurality of metal traces.

11. The panel according to claim 10, wherein the panel comprises a touch panel, the working region of the base substrate is a touch region of the base substrate, and the non-working region of the base substrate is a non-touch region of the base substrate.

12. The panel according to claim 11, further comprising:
a second conductive layer provided on the base substrate, the second conductive layer including: a plurality of second conductive traces, provided on the plurality of metal traces and covering portions of each of the plurality of metal traces other than the connection ends; and a plurality of first touch electrodes and a plurality of second touch electrodes provided in the touch region of the base substrate, wherein the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through a corresponding bridging electrode, and the plurality of second touch electrodes is insulated from the plurality of bridging electrodes by the insulating layer.

13. The panel according to claim 11, further comprising:
a second conductive layer provided on the base substrate, the second conductive layer including a plurality of first touch electrodes and a plurality of second touch electrodes provided in the touch region of the base substrate, wherein the insulating layer further covers other portions of each of the plurality of metal traces other than the connection ends, and the plurality of first touch electrodes and the plurality of second touch electrodes are correspondingly connected with the plurality of metal traces through the via holes, each of the first touch electrodes includes a plurality of first sub-electrodes, adjacent first sub-electrodes are connected with each other through a corresponding bridging electrode, and the plurality of second touch electrodes is insulated from the plurality of bridging electrodes by the insulating layer.

14. The panel according to claim 11, wherein the plurality of electrode patterns include a plurality of first touch electrodes, the plurality of metal traces includes a plurality of first metal traces and a plurality of second metal traces, and the plurality of first touch electrodes is connected with the plurality of first metal traces.

15. The panel according to claim 14, wherein
the insulating layer has a plurality of via holes exposing connection ends of the plurality of second metal traces, and the panel further comprises a second conductive layer provided on the base substrate, the second conductive layer including: a plurality of second conductive traces, provided on the plurality of metal traces and covering portions of each of the plurality of metal traces other than the connection ends; and a plurality of second touch electrodes provided in the touch region of the base substrate, wherein the plurality of second touch electrodes is correspondingly connected with the plurality of second metal traces through the via holes, and the plurality of second touch electrodes is insulated from the plurality of first touch electrodes by the insulating layer.

16. The panel according to claim 14, wherein the insulating layer further covers other portions of each of the plurality of metal traces other than the connection ends, and has a plurality of via holes exposing connection ends of the plurality of second metal traces, wherein the panel further comprises a second conductive layer provided on the base substrate, the second conductive layer including a plurality of second touch electrodes provided in the touch region of the base substrate, wherein the plurality of second touch electrodes is correspondingly connected with the plurality of second metal traces through the via holes, and the plurality of second touch electrodes is insulated from the plurality of first touch electrodes by the insulating layer.

17. A display device, comprising a panel, wherein the panel comprises:

a base substrate, including a working region and a non-working region;

a first conductive layer provided on the base substrate, the first conductive layer including a plurality of first conductive traces provided in the non-working region of the base substrate and a plurality of electrode patterns provided in the working region of the base substrate;

a plurality of metal traces provided on the plurality of first conductive traces, wherein each of the plurality of metal traces includes a connection end close to an edge of the working region of the base substrate; and an insulating layer on the base substrate, wherein the plurality of electrode patterns includes a plurality of bridging electrodes, the insulating layer covers the plurality of bridging electrodes and connection ends of the plurality of metal traces, and a plurality of via holes are formed in the insulating layer to expose the connection ends of the plurality of metal traces.

\* \* \* \* \*